(12) United States Patent
Gamberg

(10) Patent No.: US 6,456,922 B1
(45) Date of Patent: Sep. 24, 2002

(54) ANTI-LOCK BRAKE CONTROL SYSTEM TO REDUCE THERMAL LOAD

(75) Inventor: Eric M. Gamberg, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/723,465

(22) Filed: Nov. 28, 2000

(51) Int. Cl.[7] .............................................. B60T 17/22
(52) U.S. Cl. .......................... 701/71; 701/70; 303/191; 180/197
(58) Field of Search .............................. 701/70, 71, 74, 701/78, 79, 80, 82, 90; 303/191, 139, 166; 180/197

(56) References Cited

U.S. PATENT DOCUMENTS

| | | | |
|---|---|---|---|
| 4,477,124 A | 10/1984 | Watanabe | 303/100 |
| 4,591,213 A | 5/1986 | Rapoport | 303/93 |
| 4,653,816 A | 3/1987 | Lin | 303/106 |
| 5,000,281 A | 3/1991 | Nobumoto et al. | 180/197 |
| 5,136,508 A | 8/1992 | Bannon et al. | 364/426.01 |
| 5,140,524 A | 8/1992 | Matsuda | 364/426.02 |
| 5,329,453 A | 7/1994 | Tsuyama et al. | 364/426.02 |
| 5,524,974 A * | 6/1996 | Fischle et al. | 303/191 |
| 5,613,744 A | 3/1997 | Eslinger et al. | 303/191 |
| 5,731,975 A | 3/1998 | Nakashima | 364/426.028 |
| 6,012,783 A | 1/2000 | Schwarzer et al. | 303/140 |

\* cited by examiner

*Primary Examiner*—William A. Cuchlinski, Jr.
*Assistant Examiner*—Arthur D. Donnelly
(74) *Attorney, Agent, or Firm*—Gregory P. Brown

(57) ABSTRACT

An anti-lock brake control system 12 for a vehicle 10 that increases the tire slip when the vehicle brake component(s) are at an excessive thermal load. The brake control system 12 has an operator input 18 for commanding vehicle braking, and brake actuators 20A–20C for applying braking force to wheels 14A–14D in response to the operator input. In addition, the brake control system 12 includes a temperature sensor 38 for sensing temperature of a brake related component, and wheel speed sensors 36 for sensing rotational speed of the wheels. Further, the brake control system 12 includes a controller 22 for controlling the amount of braking by the brake actuators in accordance with a tire slip. The controller 22 determines the amount of tire slip during braking and increases the amount of tire slip to transfer thermal load to the vehicle tires when the temperature is excessive.

9 Claims, 3 Drawing Sheets

ANTI-LOCK BRAKE CONTROL SYSTEM TO REDUCE THERMAL LOAD

FIELD OF THE INVENTION

The present invention generally relates to vehicle braking and, more particularly, to an anti-lock brake control system.

BACKGROUND OF THE INVENTION

Many automotive vehicles are equipped with an anti-lock brake system (ABS) which modulates the brake force actuation to control the amount of tire slip between the tire and the road surface, in order to maintain stability of the vehicle during braking. Conventional brake systems generate a braking force at the wheels of the vehicle, in response to the vehicle operator depressing a brake pedal, which, in turn, resists rotation of the wheels and creates a deceleration force at the tire and driving surface interface. If the tire slips beyond a certain amount, the braking force between the tire and the driving surface is controlled to reduce the tire slip on the driving surface so as to maintain vehicle stability during vehicle braking. As each tire approaches or exceeds the peak of a mu-slip curve, electronic control is employed to maintain lateral force generating potential. As the tire slip increases past the peak on the slip curve, the wheels may lock up, thereby creating possible vehicle instability.

Typical anti-lock brake systems prevent the wheels from locking by reducing the brake force applied to the wheels by modulating the brake force. As a consequence, the brake force is repeatedly increased and decreased in a cyclical fashion. In order to maintain stability of the vehicle, most anti-lock brake systems do not maximize vehicle braking. Instead, current anti-lock brake control systems limit tire slip to the detriment of decreased stopping distances, in case the driver should command a change in direction (i.e. yaw) as occurs when the steering wheel is turned.

In addition, the capacity of vehicle brake systems is generally limited by the amount of vehicle weight that can be allocated to the brake system both from a mass and volume standpoint. Brake components such as the rotor, temporarily store thermal energy that is generated by the sliding friction between the brake pads and the rotor when slip occurs during an anti-lock braking event. The energy transformed by the brake components is generally proportional to the brake torque multiplied by the number of revolutions of the wheel. As the number of wheel revolutions is reduced for a given type of stop, the amount of energy temporarily absorbed by the brakes is likewise reduced. Many tire constructions exhibit a longitudinal force versus slip curve that only gradually reduces the available longitudinal force as the tire slip is increased past the peak of the mu-slip curve. In cases where repeated vehicle stops with minimum fade are required, the amount of thermal energy that builds up in the brake components may lead to relatively high brake component temperature and eventually to reduced braking capability. This reduced braking capability could easily be less than the effect of slipping the tire at close to the 100% slip point with cooler brake operation.

Accordingly, there is a need for an anti-lock brake control system in a vehicle that controls vehicle braking so as to limit the thermal load applied to brake components to prevent brake component over-temperature and maintain adequate vehicle braking capabilities during repeated brake events occurring before the brake components have had a sufficient time to cool.

SUMMARY OF THE INVENTION

In accordance with the teachings of the present invention, an anti-lock brake control system is provided for a vehicle having a wheel and a brake for applying braking force to the wheel in response to an operator brake command input. The brake control system includes an operator input for commanding vehicle braking, and a brake actuator for applying braking force to the wheel in response to the operator input. In addition, the brake control system includes a temperature determining device., such as a temperature sensor, for sensing temperature of a brake related component, and a wheel speed sensor for sensing rotational speed of the wheel. Further, the brake control system includes a controller for controlling the amount of braking force applied by the brake actuator in accordance with tire slip as determined by the wheel speed. The controller determines the tire slip during braking and increases the tire slip to limit brake heat generation while maintaining adequate braking when the determined temperature exceeds a predetermined temperature threshold. Accordingly, the brake control system of the present invention reduces thermal load at the brake related component when the thermal load is excessive.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
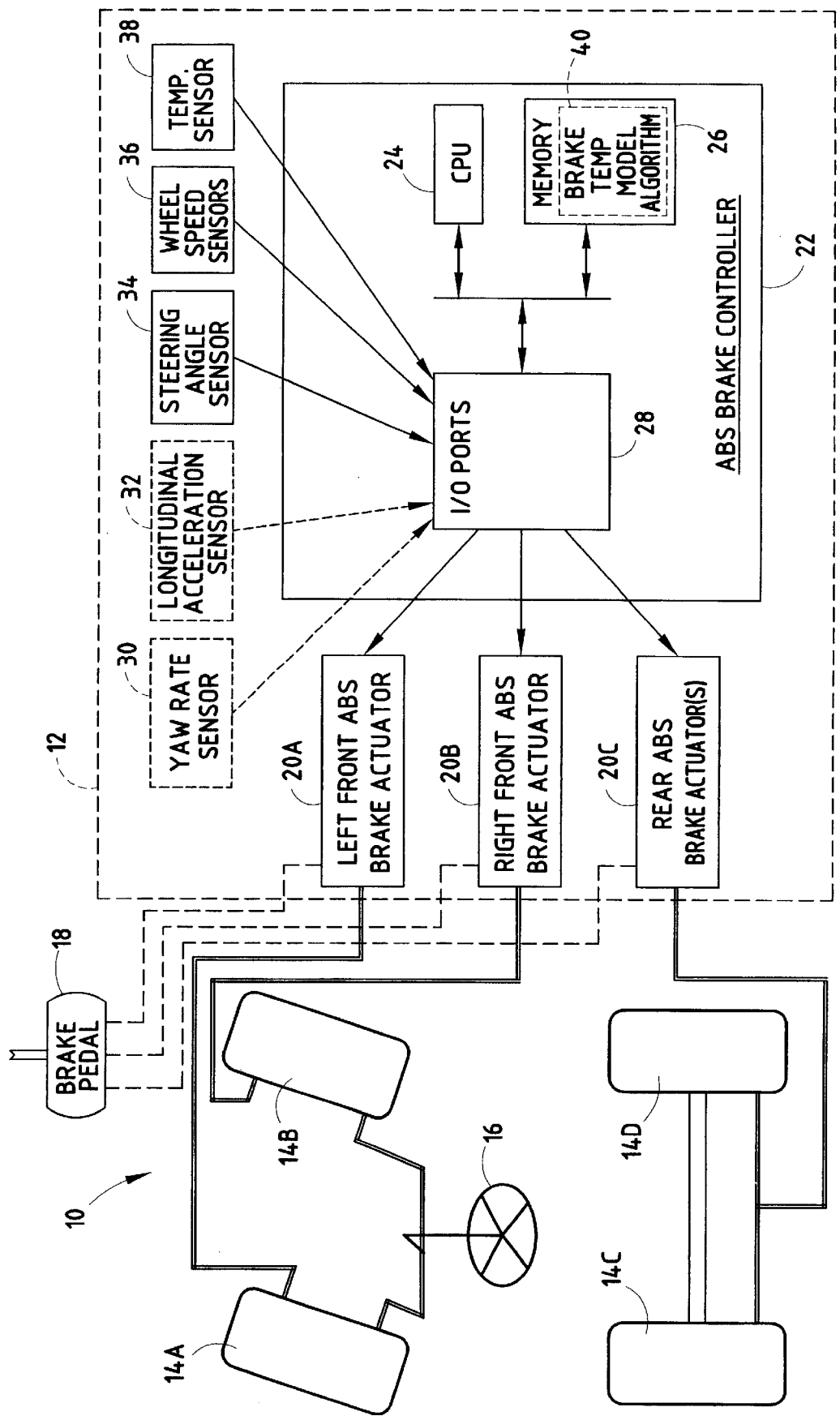
FIG. 1 is a block diagram illustrating a vehicle having an anti-lock brake control system according to the present invention.

Referring to FIG. 1, an automotive vehicle is generally depicted by reference numeral 10 and is equipped with an anti-lock brake control system 12 according to the present invention. The brake control system 12 controls the braking force applied by an anti-lock brake system to one or more vehicle wheels so as to reduce thermal load applied to the brakes and prevent overheating of the brake components, particularly during repeated braking events. The brake control system 12 of the present invention senses temperature of one or more brake related components and automatically adjusts the vehicle braking during a braking event by increasing a tire slip to reduce the rate of thermal load buildup at the brake components.

The vehicle 10 is shown having a pair of front tires 14A and 14B, and a pair of rear tires 14C and 14D. Each of tires 14A–14D is mounted on a corresponding wheel as is well known in the art. The vehicle is also equipped with a brake pedal 18 that is depressible, by the driver of the vehicle, to command a vehicle braking event. In a hydraulic-actuated brake system, a master cylinder generates hydraulic fluid pressure in response to the brake command input. The pressurized hydraulic fluid, in turn, applies a braking force via brake actuators to engage frictional brake pads with disc or drum brake members, to resist rotation of the wheels associated with the corresponding tires 14A–14D. Disc brakes commonly employ a brake pad for providing frictional contact with a rotor that is attached to the wheel, whereas drum brakes include a brake pad for frictionally engaging a drum. It should be appreciated that as the brake pad contacts the rotor or drum, continued movement relative thereto results in the generation of thermal load (i.e., heat). The rotor or drum has a volume and mass generally capable of storing the thermal energy to a limited extent. However, excessive brake component temperatures may lead to reduce brake friction and reduce the vehicle braking performance.

The anti-lock brake control system 12 includes a left front ABS brake actuator 20A and a right front ABS brake actuator 20B for independently applying braking force to the corresponding front tires 14A and 14B, respectively. In addition, a rear ABS brake actuator 20C is provided for applying braking force to each of the rear tires 14C and 14D. It should be appreciated that the rear ABS brake actuator 20C may include a single brake actuator shared commonly by both tires 14C and 14D, or may include separate independent ABS brake actuators for each of tires 14C and 14D, similar to brake actuators 20A and 20B.

The anti-lock brake control system 12 further includes an ABS brake controller 22 for controlling the braking operation, including adjusting the braking force applied to the tires 14A–14D. The brake controller 22 preferably includes a microprocessor and memory for storing and processing one or more brake control algorithms. The controller hardware may include a commercially available controller. In particular, controller 22 includes input/output (I/O) ports 28, a central processing unit (CPU) 24, and memory 26. The controller 22 receives various sensed signals from sensors, as shown, and, in response to the brake control algorithm (s), generates output control signals to each of brake actuators 20A–20C.

The brake controller 22 receives a sensed steering angle signal from a steering angle sensor 34, and sensed wheel speed signals from wheel speed sensors 36 associated with each of the wheels/tires 14A–14D. The sensed steering angle signal provides an indication as to whether the steering wheel is turned, relative to a straightline vehicle travel command, so as to command the vehicle to turn. A steering angle turn event is established whenever the sensed steering angle deviates from the straightline vehicle trajectory by greater than a determined amount. Accordingly, the vehicle is determined to be traveling in a straight line provided the steering angle is within the determined amount.

The brake controller 22 also receives one or more temperature signals indicative of the temperature of one or more brake components. The temperature signal(s) may be generated by one or more temperature sensors 38 positioned at brake components, such as the rotor, associated with one or more wheels of the vehicle. Alternately, the temperature signal can be predicted based on other data, such as an ambient temperature, and known characteristics of the brake system and vehicle. The brake controller 22 may employ a thermal model of the brake system temperature state to estimate thermal load buildup in the brake components. It should be appreciated that the use of temperature sensors and thermal models for estimating temperature are well known in the vehicle brake art.

In addition, brake controller 22 may further receive a sensed yaw signal from a yaw rate sensor 30, and a sensed longitudinal acceleration signal from a longitudinal acceleration sensor 32. The yaw rate sensor provides a yaw signal which indicates whether or not the vehicle is yawing, independent of whether the steering wheel is turned. If all vehicle wheels are operating at high slip while the vehicle is still moving, it can be difficult to accurately determine vehicle speed. The longitudinal acceleration signal 32 provides a means to determine more accurate vehicle speed during a braking event, particularly when relatively high tire slip occurs. Preferably, the longitudinal acceleration sensor 32 is a biaxial sensor that is capable of inferring vehicle angle to the force of gravity in addition to vehicle deceleration.

Figure 2:
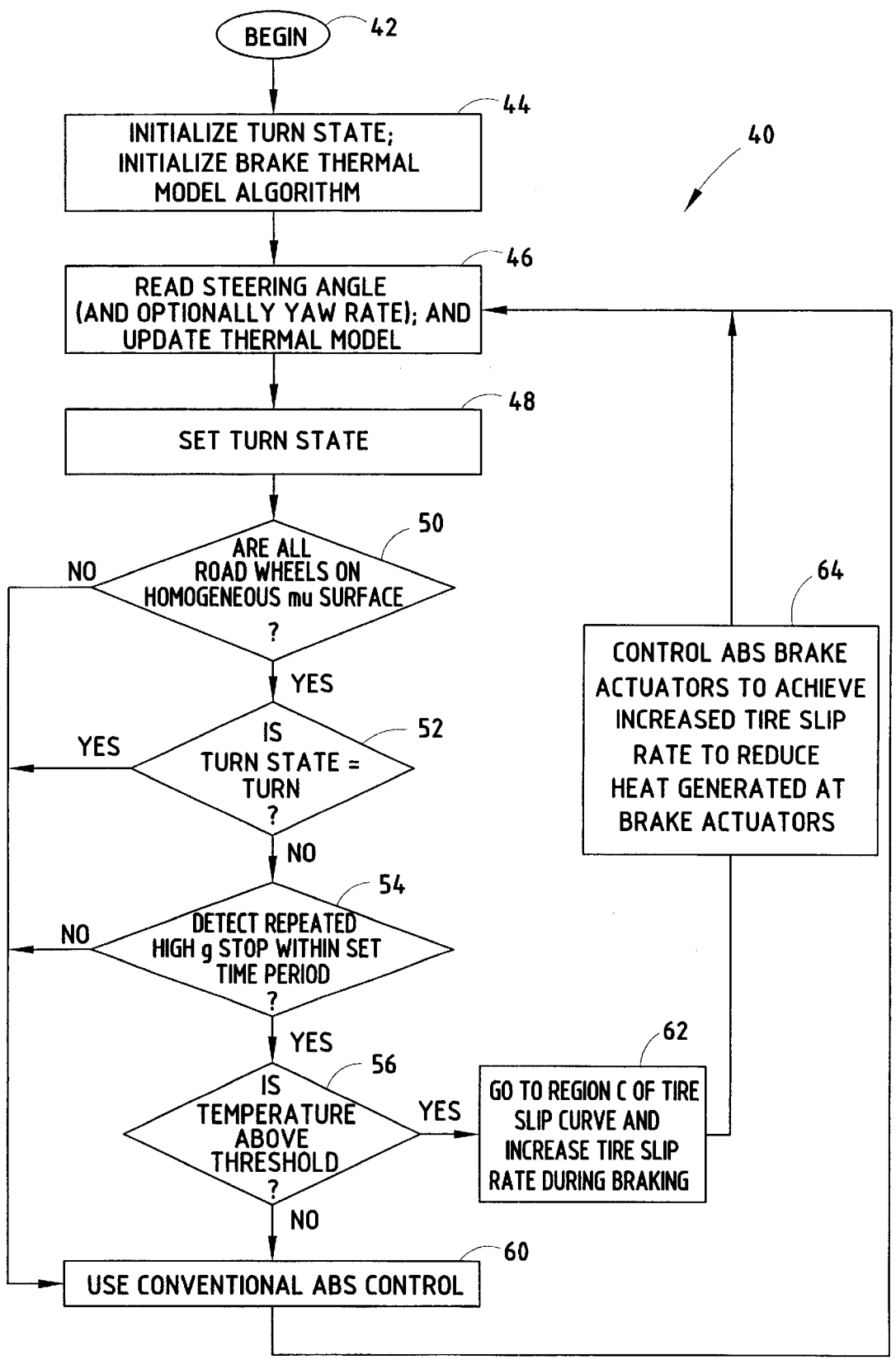
FIG. 2 is a flow diagram illustrating a method of controlling the anti-lock brake control system to reduce thermal load applied to the brake system when the temperature is excessive, according to the present invention.

The ABS brake controller 22 is programmed in memory 26 to perform a brake control methodology 40 according to the present invention, as shown in FIG. 2. The brake control methodology 40 begins at step 42 and proceeds to step 44 to initialize the turn state and to initialize the brake thermal model algorithm. The turn state initialization and brake thermal model algorithm initialization occur at vehicle startup. Next, the sensed steering angle, and, if available, the sensed yaw rate, as sensed by sensors 34 and 30, respectively, are read into memory in step 46. In addition, the update thermal model is read into memory in step 46. The thermal model monitors braking events and determines how much thermal energy (heat) is stored in the brake components of interest, and updates the state of the model to estimate brake component temperature. Next, in step 48, the turn state is set, which includes checking sensor states over a time period to verify that the steering angle measurement is accurate enough to determine if the vehicle is traveling in a substantially straight line.

Once the turn state is set, brake control methodology 40 proceeds to decision step 50 to check if all road wheels are on a homogenous mu surface. If all road wheels are not on a homogenous mu surface, indicative that the road surface varies such as having one or more wheels on a dirt shoulder and one or more wheels on a paved road, for example, conventional ABS control is employed in step 60, before returning back to step 46. If all road wheels are determined to be on a homogenous mu surface, brake control methodology 40 proceeds to decision step 52 to check if the turn state is determined to be equal to a turn event. The turn state indicates whether the vehicle is turning as determined by the sensed steering angle signal indicating that the road wheel angle is greater than a one degree turn angle relative to straight line vehicle travel. If the vehicle is determined to be turning, brake control methodology 40 uses the conventional ABS brake control in step 60, before returning back to step 46.

Figure 3:
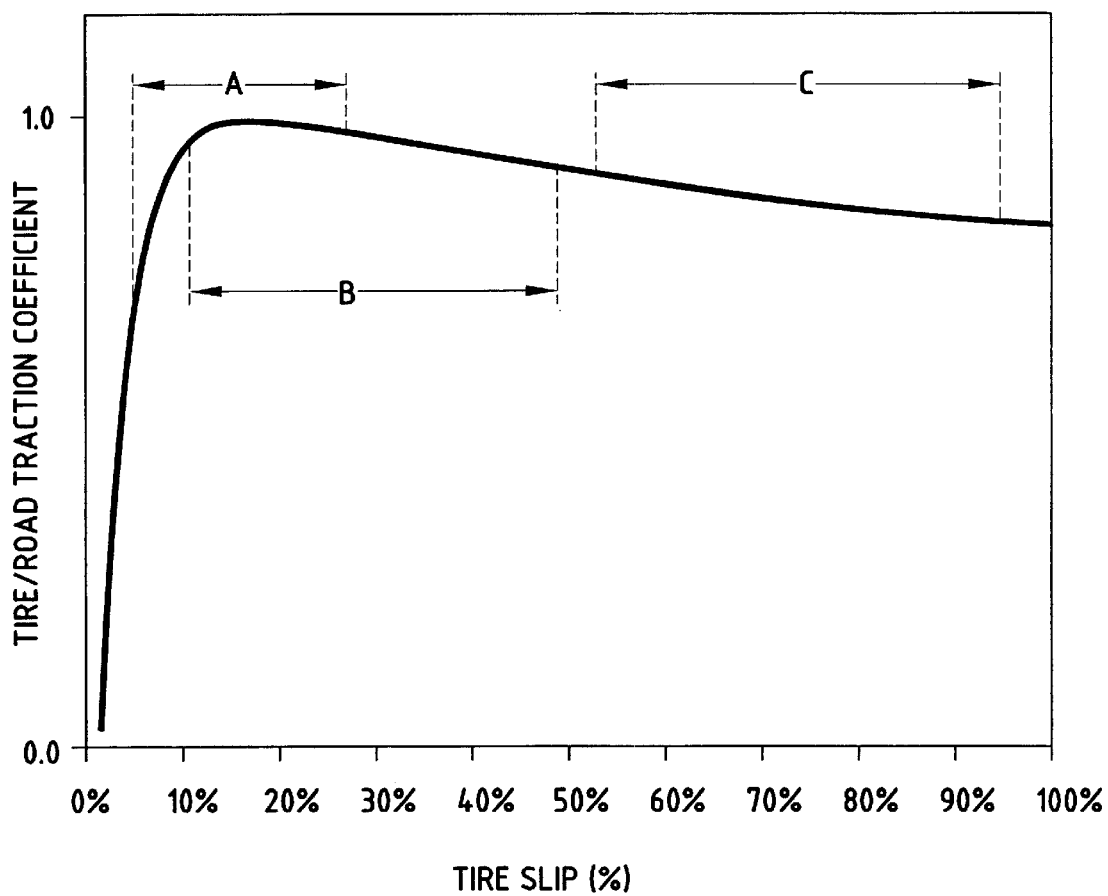
FIG. 3 is a graph illustrating a mu-slip curve and multiple regions of control for controlling vehicle braking.

If it is determined that the vehicle is not turning, but instead is commanded to travel in a substantially straight trajectory, brake control methodology 40 proceeds to decision step 54. It should also be appreciated that the brake control methodology 40 may change brake control from a first low region of the slip curve, such as region A, to a second higher region of the slip curve, such as region B, as shown in FIG. 3, according to one example, as is disclosed in a co-filed and commonly assigned patent application Serial No. 09/723,457, entitled "ANTI-LOCK BRAKE CONTROL SYSTEM HAVING ENHANCED STRAIGHT-LINE BRAKING EFFICIENCY." As such, by moving from lower region A to high region B of the slip curve during substantially straightline vehicle travel, the vehicle braking can be optimized, and even maximized.

In decision step 54, brake control methodology 40 detects repeated high g deceleration (stops) within a set time period so as to determine whether the vehicle is repeatedly braking with high brake demand. According to one embodiment, step 54 checks for at least three stopping events having a g deceleration value of over seven meters/sec$^2$. If repeated high g stops are not detected within the time period, conventional ABS control is employed in step 60. If repeated high g stops are detected within the set time period, brake control methodology 40 proceeds to decision step 56 to check whether the temperature of one or more brake components is above a predetermined temperature threshold. The predetermined temperature threshold is at a level sufficient to allow normal braking operation for brake component temperatures below the threshold. Accordingly, if the temperature is not above the predetermined temperature threshold, conventional ABS brake control is employed in step 60. However, if the temperature exceeds the predetermined temperature threshold, brake control methodology 40 will change brake control to advance to the third region C of the tire slip curve, as shown in FIG. 3, and thereby increase the tire slip during braking events. Employing region C of the tire slip curve, in step 64, the ABS brake actuators are controlled to achieve increased tire slip to reduce the amount of heat that would otherwise be generated at the brake actuators. This is accomplished by controlling the brake actuators so as to provide increased tire slip at the tire/driving surface interface such that thermal load is passed onto the tires and driving surface instead of the brake components. Following step 64, brake control methodology 40 returns back to step 46.

Accordingly, the brake control system 12 of the present invention automatically controls the amount of braking force so as to reduce further thermal load buildup at the brake components when an excessive temperature exists, and preferably when the vehicle is traveling in a substantially straight line. The brake control is accomplished by the controller changing from a first low region, such as region A, of the slip curve to an increased region, such as region C, of the slip curve, which allows for an increased tire slip during extreme (high end) temperature conditions. When the temperature signal indicates that the temperature has dropped below the predetermined temperature threshold, it should be appreciated that the brake control returns to the lower brake region A of the slip curve to decrease the tire slip and resume normal ABS brake control.

It should be appreciated that the brake control system 12 of the present invention is particularly well-suited for use on anti-lock brake control systems where the vehicle braking can be adjusted electronically. While the brake control system 12 may be employed with a hydraulic-actuated brake system, an electromechanical-actuated braking system, or other types of braking actuators may be employed without departing from the spirit of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. An anti-lock brake control system for a vehicle having a wheel and a brake for applying braking force to the wheel in response to an operator brake command input, said brake control system comprising:

an operator input for commanding vehicle braking;

a brake actuator for applying braking force to the wheel in response to the operator input;

a temperature determining device for determining a temperature signal indicative of temperature of a brake component;

a sensor for sensing a steering angle of the vehicle;

a wheel speed sensor for sensing rotational speed of said wheel; and a controller for controlling the amount of braking force applied by the brake actuator in accordance with a tire slip, said controller determining the tire slip as a function of the sensed wheel speed during braking and increasing the tire slip when the determined temperature exceeds a predetermined temperature threshold, wherein said controller determines if the vehicle is turning and prevents increasing the tire slip when said vehicle is turning.

2. The brake control system as defined in claim 1, wherein said controller increases the tire slip by shifting from a first slip region of a tire slip curve to a second higher slip region of the tire slip curve.

3. The brake control system as defined in claim 1, wherein said temperature determining device for determining the temperature signal comprises a temperature sensor.

4. An anti-lock brake control system for a vehicle having a wheel and a brake for applying braking force to the wheel in response to an operator brake command input, said brake control system comprising:

a temperature determining device for determining a temperature signal indicative of temperature of a brake component;

a sensor for sensing a steering angle of the vehicle;

a wheel speed sensor for sensing rotational speed of said wheel; and a controller for controlling the amount of braking force applied by the brake actuator in accordance with a tire slip as determined from the sensed wheel speed, said controller increasing the tire slip when the determined temperature exceeds a predetermined temperature threshold, wherein said controller determines if the vehicle is turning and prevents increasing the tire slip when said vehicle is turning.

5. The brake control system as defined in claim 4, wherein said controller increases the tire slip by shifting from a first region of a tire slip curve to a second higher region of the tire slip curve.

6. The brake control system as defined in claim 4, wherein said temperature determining device for determining the temperature signal comprises a temperature sensor.

7. A method for controlling an anti-lock brake system for a vehicle having a wheel and brake for applying braking force to the wheel in response to an operator brake command input, said method comprising the steps of:

sensing a temperature of a brake component of the vehicle;

sensing rotational speed of the wheel;

sensing an operator input for commanding vehicle braking;

applying braking force to said wheel in response to said operator input;

determining a tire slip based on the sensed wheel speed during said vehicle braking force;

increasing the tire slip when the determined temperature exceeds a predetermined temperature threshold so as to reduce the thermal load applied to the braking component;

sensing a steering angle of the vehicle;

determining if the vehicle is turning based on the sensed steering angle; and preventing increasing the tire slip when said vehicle is determined to be turning.

8. The method as defined in claim 7, wherein said step of increasing the tire slip comprises a shifting from a first slip region of the tire slip curve to a second higher slip region of the tire slip curve.

9. The method as defined in claim 7, wherein said temperature is determined based on a sensed temperature signal.

* * * * *